T. W. PAGE.
CONVERTIBLE PLANTER AND CULTIVATOR.
No. 7,037. Reissued April 4, 1876.
Fig. 2.
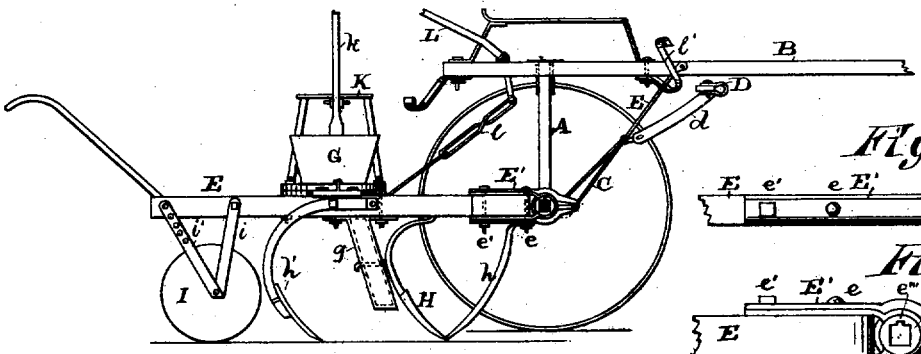
Fig. 5
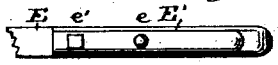
Fig. 3
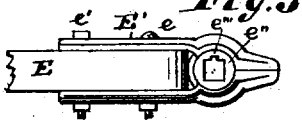
Fig. 1
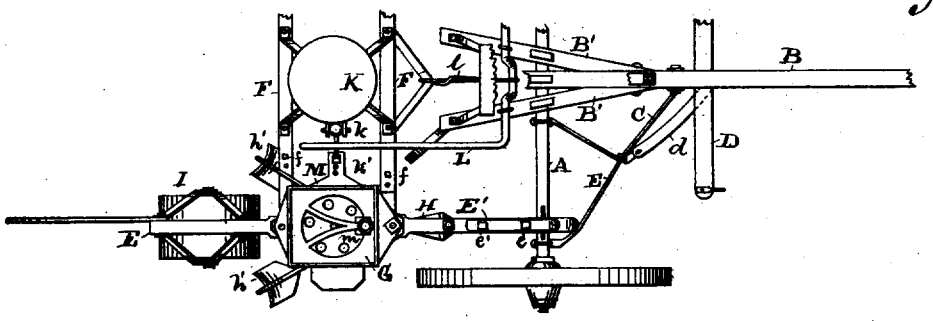
Fig. 4
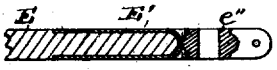
Fig. 6
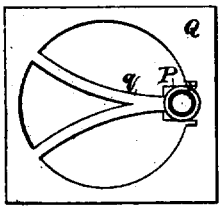
Fig. 7
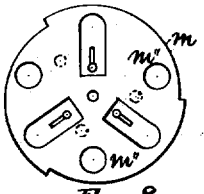
Fig. 8
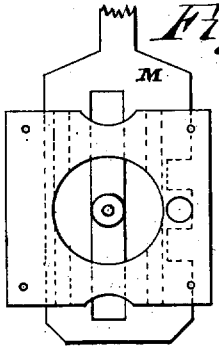
Fig. 9
Fig. 10
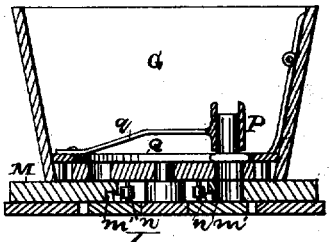
Witnesses:
L. Van Riswick.
D. Hannay
Inventor:
Thomas W. Page
by W. B. Richards & A. McCallum
Attys.
N. PETERS, PHOTO-LITHOGRAPHER, WASHINGTON, D. C.

UNITED STATES PATENT OFFICE.

THOMAS W. PAGE, OF CANTON, ILLINOIS, ASSIGNOR, BY MESNE ASSIGNMENTS, TO WILLIAM BABCOCK, SR., AND THE PAGE MANUFACTURING COMPANY, OF SAME PLACE.

IMPROVEMENT IN CONVERTIBLE PLANTERS AND CULTIVATORS.

Specification forming part of Letters Patent No. 156,590, dated November 3, 1874; reissue No. 7,037, dated April 4, 1876; application filed February 14, 1876.

*To all whom it may concern:*

Be it known that I, THOMAS W. PAGE, of Canton, county of Fulton, and State of Illinois, have invented certain new and useful Improvements in Convertible Seed-Planters and Cultivators; and I hereby declare the following to be a full, clear, and exact description of the construction and operation of the same, reference being had to the accompanying drawing, in which—

Figure 1 is a top view of a machine embodying my invention, the driver's seat partly broken away. Fig. 2 is a side elevation of Fig. 1, with near wheel removed. Fig. 3 is an enlarged side elevation of the coupling to the axle. Fig. 4 is a horizontal sectional view of the same, and Fig. 5 is a top view thereof. Fig. 6 is a top view of the cap over the seed-cup bar. Figs. 7 and 8, respectively, top plan and elevation of the seed-cup plate. Fig. 9 is a top view of the lower plate of the dropping devices, with the slide below, partly in dotted lines; Fig. 10, a vertical sectional view through the seed-box, in the line *x x* of Figs. 6, 7, 8, 9.

The nature of my invention relates to a machine convertible from a seed-planter to a cultivator, and vice versa; and the invention consists, first, in the combination of certain changeable devices with certain devices common to a planter and a cultivator, for converting the machine from one to the other; second, in the construction of the coupling-joint to render it rigid laterally for a planter and flexible for a cultivator; third, in the manner of connecting the coupling-joint to the axle; fourth, in the manner of connecting the double-tree to the machine at the forward end of brace-rods from the axle; fifth, in the arrangement upon the same single rigid beam of a furrow-opener, seed-tube, two pulverizing and covering shovels, and rear gage-wheels, all as hereinafter fully described.

Referring to the parts by letters, A represents an ordinary centrally-elevated cultivator-axle, with a tongue, B, and hounds B′, and braces C, connecting the lower horizontal part of the axle with the tongue forward of the axle. D is the double-tree, supported on the forward ends of rods *d*, which extend back and encircle the braces C for supports, and thence downward and connected to the lowest part of the axle, or on a line with the attachment of the plows or planter, for the purpose of bringing the draft in a direct line, and relieving all neck-draft on the horses.

E E are beams, having handles at their rear ends for cultivator uses, and are connected at their forward ends to the square lower portion of the axle by means of a casing, which receives the forward end of the beam at one end, and is secured thereto by a fixed bolt, *e*, and removable bolt *e′*. The forward ends of the casings E′ clasp a block, *e″*, which has an annular rib seated in a corresponding groove in the casings, which are bolted together at their forward ends in front of the axle. The blocks *e″* fit over the square portion of the axle A, and are secured at any desired lateral position thereon by a key, *e‴*, for adjusting the lateral distances between the beams E.

The bolt *e′* is removed to allow lateral motion of the beams E for cultivator, and is placed in position to make rigid beams laterally for planting.

F F are bars, adjustable in length by holes and bolts *f*, and are removably attached to the central parts of the beams E. Each beam E carries a seed-box, G, seed-tube *g*, shovel-shaped furrow opener H, preceding the tube *g*, and preceded by a colter, *h*, and two shovel-shaped covering and pulverizing devices, *h′*, in rear and at either side of the seed-tube *g*, and a rear wheel, I, suspended below the beam by standards *i i′*, the one, *i′*, being pierced with holes *i″*, by means of which and a bolt the wheels I may be adjusted to gage the depth of penetration of the seeding devices in planting.

K is a seat, mounted on the bars F, for the operator of the seed-dropping devices, by means of the hand-lever *k*, which operates the shake-rod *k′*, in the usual manner.

L is a crank-rod, journaled on the rear ends of the hounds, its lower end connected, by a link-rod, *l*, with the forward bar F, and its upper end, which is in close proximity to the driver's seat, so arranged that it may be turned downward forward and engaged with a catch, $l'$, for the purpose of elevating and retaining in an elevated position the beams E and seeding devices of the planter.

M is a slide formed on each end of the shake-rod $k'$, is adjustably attached to the rod $k'$, and rotates the seed-cup plates $m$, by means of dogs $m'$, which alternately strike lugs $n$ on the lower side of said plate $m$. The plates $m$ contain series of seed-cups $m''$, which pass successively beneath a cut-off, P, consisting of a plate with a stem upward through a tube carried on the cap Q by a bridge, $q$. The central part of the cap Q is removed to allow the seed to rest over the seed-cups in plate $m$. By removing the bars F, bolt $e'$, and a portion of the seeding devices, the machine is easily convertible to a cultivator. The shovels and furrow-opener are interchangeable. This seeder may be used to plant corn in ground cultivated or plowed the previous year, preparing and planting at one operation, and, seeding completed, it may be converted into a cultivator for cultivating corn, cotton, or other plants in rows.

Having thus described my invention, what I claim as new, and desire to secure by Letters Patent, is—

1. The bars F and bolt $e'$, removably attached to the beams E, carrying seeding and cultivating devices, and combined with said beams and the axle A, for converting the machine interchangeably, substantially as described, and for the purpose specified.

2. The combination of the plate E′, and blocks $e''$, and bolts $e$ $e'$, the latter bolt, $e'$, being removable, so as to adapt the machine for use as a planter or cultivator, substantially as set forth.

3. The plates E′, combined with the blocks $e''$, axle A, keys $e'''$, and beams E, substantially as described, and for the purpose specified.

4. The combination of the axle A, rods $d$, and double tree D, the latter being thereby sustained in position without connection with the tongue, substantially as and for the purpose set forth.

5. The furrow-openers H, seed-tubes $g$, shovels $h'$, and gage-wheels I, combined with beams E, carrying seed dropping devices, substantially as and for the purpose specified.

THOMAS W. PAGE.

Witnesses:
THOS. MCKEE,
W. B. RICHARDS.